DATA PROCESSING APPARATUS

Filed Sept. 28, 1962 2 Sheets-Sheet 2

3,284,776

DATA PROCESSING APPARATUS

Arye Leib Freedman, London, England, assignor to Decca Limited, London, England, a British company Filed Sept. 28, 1962, Ser. No. 226,855
11 Claims. (Cl. 340—172.5)

Figure 1:
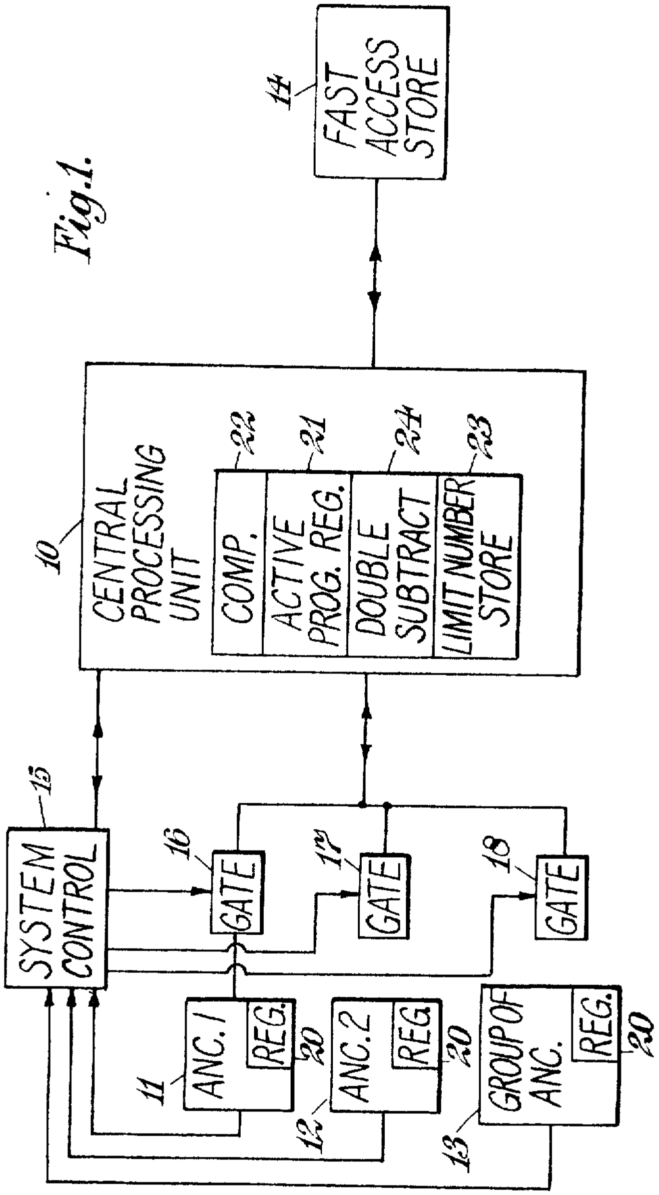

Data processing apparatus may be capable of processing data at a very high speed but the rate of completion of a programme may be limited due to the time required by ancillary units to feed information into a central processing unit or to take information out therefrom. For example magnetic tape apparatus or punched card or paper input or output devices have a data rate which is usually very much slower than the data rate of the central processing unit. Such ancillary apparatus may not therefore keep the central processing unit fully occupied. In data processing apparatus it is possible to carry out one programme in the intervals between the processing of information forming a second programme. For example, a higher priority programme may be carried out as input data becomes available from a relevant ancillary unit or as another ancillary unit becomes available to take output data. A lower priority programme may be performed in the intervals of this higher priority programme. It is therefor a common practice for data processing apparatus to perform two or more programmes, the available time in the central processing unit being shared amongst the programmes as necessary.

According to one aspect of the present invention in data processing apparatus having a number of ancillary units and a central processing unit for carrying out two or more programmes on a time-sharing basis, there is provided a control register storing the number of the programme currently being performed by the central processing unit and each ancillary unit is provided with a register storing the number of the programme currently associated with that ancillary unit and comparator means are provided, operative when an instruction is about to be performed involving the transfer of information from one ancillary unit to another ancillary unit or the transfer of information to or from the central processing unit, which comparator means compare the numbers in the registers of the ancillary units between which the information is to be transferred or the numbers in the control register and the ancillary register if information is to be transferred to or from the central processing unit, said comparator means being arranged to inhibit the transfer of information unless the compared numbers agree. Each ancillary unit at any one time must be assigned to one programme and the arrangement of the present invention can thus provide a safeguard against information relating to one programme being fed into the central processing unit or into an ancillary unit which has been allocated to another programme. Thus it is not possible, due to any programming error in one programme, to interfere with another programme. The arrangement of the present invention can also provide a safeguard against information relating to one programme being extracted and used for another programme.

Commonly the data processing apparatus would have a main store to provide quick access storage; this main store may be divided into blocks which are each associated with one programme only and, for each block, there may be provided a register storing the number of the associated programme and the aforementioned comparator means may be arranged, when information is to be transferred to or from a selected location in the main store, to compare the number on the register associated with the block containing the selected location with the number in the control register or with the appropriate ancillary unit according to the destination or source of the information to be transferred. The blocks of the main store are thus, in effect, treated as separate ancillaries for this purpose and each is thus safeguarded against interference between programmes since information relating to one programme cannot be written into a part of the main store allocated to another programme even if there is a programming error in one programme.

Many modern data processing systems are provided with means which make it possible for data to be deposited by ancillary units directly into the main store or which make it possible for ancillary units to extract data directly from the main store. Other systems have direct interruption facilities as described in the specifications of U.S. application Serial No. 46,003 and British application No. 35,510/59. In either case the ancillary units and stores may be safeguarded by comparing the number in the safeguarding register in the ancillary unit with the number in the appropriate safeguarding register associated with the store. These safeguarding arrangements are particularly convenient in the case of directly integrated systems such as are described in the specification of British application No. 33,510/59 since these normally contain arrangements for transferring the states of a number of controlling element, for example bistables, on the ancillary units to the central computing unit. The safeguarding register on the ancillary unit may then be constituted simply by an extension of the register constituting the controlling elements.

In the case of the main store, an alternative arrangement is possible for safeguarding blocks in to which the store is divided. For each block there may be provided registers storing data defining the limits of the block and double comparator means may be provided, operative when information is to be transferred to or from a selected location in the main store, to compare the address of the selected location with the data defining the limits of the block associated with the appropriate programme defined by the programme number in the control register or the appropriate ancillary register according to the destination or source of the information to be transferred, said double comparator means being arranged to inhibit the transfer of information unless the selected location is within the defined block limits. The registers associated with each block may conveniently comprise two registers defining the first and last locations of a block of storage locations allocated to the programme and the comparator unit may then be arranged to effect two subtractions to be carried out every time data is deposited into the main store to check that the data is in fact being deposited into the portion of the store allocated to the particular programme.

According to another aspect of the present invention, in data processing apparatus having a number of ancillary units and a central processing unit for carrying out two or more programmes on a time-sharing basis, the central processing unit has a main store forming quick access storage divided into blocks which are each associated with one programme only and there is provided, for each programme, a separate programme ancillary unit for inserting the appropriate sequence of instructions for the progamme into the central processing unit, each programme ancillary unit having registers for storing data specifying the limits of quick access storage in the central processing unit required for that programme, and each programme is arranged so that, if any instruction is extracted the result of which will be for data to be deposited in the quick access storage, the specified location in the store of such data is compared with the specified limits of quick access storage for that programme and the instruction is carried out only if the location is within these limits. Each programme thus has certain quick access storage allocated for that programme and this storage is only available for that programme. This arrangement provides a safeguard against information relating to one programme being written into a location in the quick access storage which has been allocated to another programme and thus it is not possible, due to a programming error in one programme, to interfere with another programme.

The registers for storing data specifying the limits of quick access storage conveniently comprise two registers defining the first and last locations of a block of storage locations allocated to the programme. Thus when an instruction is extracted of which the result will be for data to be deposited in the quick access storage, two subtractions may then be performed to see whether the specified operand lies within the block specified by the two limit registers. Preferably means are provided for indicating to an operator if the operand does not lie within the specified limits; for example this may be reported on a monitoring typewriter. By using fast circuitry, the additional subtractions need not slow down the machine. The limit registers would not normally be accessible to the programmer and would preferably be arranged so that they can only be written into by the input routine.

In the simplest form, each programme ancillary unit, in addition to the limit registers might comprise a sequence control register for inserting a specified sequence of instructions into the central processing unit one after the other. The programme ancillary, in general, would not have any processing facilities of its own. The central processing unit may however insert data into the sequence control register of a programme ancillary unit as is required, for example, when performing jump instructions.

Preferably each programme ancillary unit also has two ancillary registers which conveniently are locations in the quick access store of the central processing unit, and the data processing apparatus is arranged so that, when a programme ancillary is activated, the sequence control number and contents of the accumulator for that programme are transferred from the two ancillary registers allocated to that programme ancillary unit to active registers in the central processing apparatus and so that, when a programme is suspended, the sequence control number and the contents of the accumulator are returned to the ancillary registers. The ordinary programme is suspended when an ancillary input or output device calls for the use of the central processing unit, the ordinary programme vacating the active programme registers for the period of the interruption. In such an arrangement in which each programme ancillary unit has two ancillary registers for storing the sequence control number and the contents of the accumulator, an interruption programme called for by one ancillary input or output unit cannot be interrupted by another interruption programme called for by another ancillary input or output unit and the system control must be arranged accordingly. If the central processing unit has more than one accumulator, an appropriate number of registers would be provided so that the contents of all the accumulators may be temporarily transferred to these registers when a programme is suspended.

It may be necessary to use an ancillary unit for two or more independent programmes. In such a case, it is desirable also to safeguard such ancillary units in common use against interference between programmes. For this purpose each such ancillary unit may, as previously described, be provided with a register holding data representative of the programme for which the ancillary unit is active when information is to be transferred and the central processing unit may have a control register storing the number of the programme currently being performed by the central processing unit and comparator means provided operative when an instruction is about to be performed involving the transfer of the information from one ancillary unit to another ancillary unit or the transfer of information to or from the central processing unit, said comparator means comparing the numbers in the registers in the ancillary units between which the information is to be transferred or the numbers in the control register and the ancillary register if information is to be transferred to or from the central processing unit and being arranged to inhibit the transfer of information unless the numbers agree. The ancillary unit to be safeguarded may be arranged so it will only operate if its register is set at zero (corresponding to the ancillary being unemployed) or is set to a condition corresponding to the programme ancillary unit active at the time. The programme ancillary number will be transmitted with the instruction to the specified ancillary unit with the required instruction for the operation of the ancillary unit and would be compared with the setting of the register in the ancillary unit. If the number on this register is zero or the same as that of the active programme, the instruction is performed, and if not, a suitable indication is given.

Figure 2:
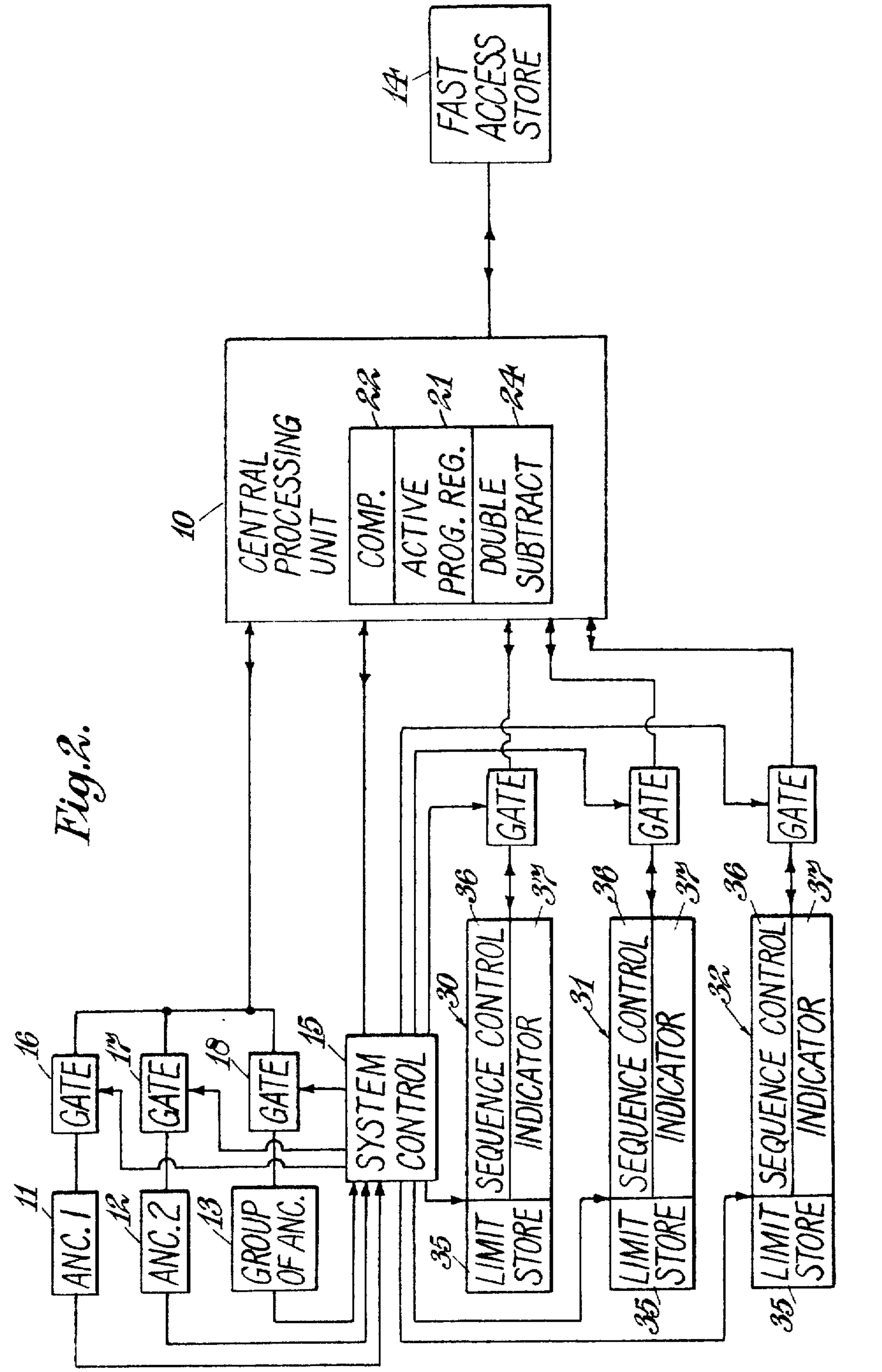

The following is a description of two embodiments of the invention reference being made to the accompanying drawings in which FIGURES 1 and 2 are each block diagrams illustrating data processing apparatus.

Referring to FIGURE 1 there is shown diagrammatically data processing apparatus comprising a central processing unit 10 and a number of ancillary units. Two separate ancillaries are indicated by the blocks 11 and 12 whilst the block 13 indicates a number of ancillary units having certain common safeguarding facilities to be described later. It will be understood that there may be many more ancillary units but, for simplicity, only blocks 11, 12 and 13 have been shown. The central processing unit 10 receives information from or feeds information to these ancillary units which may be of various types and which may include for example output units such as printers for printing output information or input units for feeding information into the central processing unit or storage units such as a magnetic tape unit which can receive information from the central processing unit and can feed information into the central processing unit. The ancillary units will generally have a data rate much lower than the data rate of the central processing unit and the various ancillary units will operate at times independent of the central processing unit data rate and generally independently of another. There is also a fast access store 14 under the control of the central processing unit 10 and a system control unit 15 which includes priority control means to determine which of the ancillary units should have access to the central processing unit 10 if two or more ancillary units should call at the same time. To avoid destruction of essential information in the central processing unit, a programme may only be interrupted at certain points and the system control is arranged to connect an ancillary unit to the central processing unit only when the latter is available for use. There are therefore provided gates 16, 17, 18 between the units 11, 12, 13 and central processing unit 10, which gates are controlled by the system control unit 15. The apparatus thus far described constitutes known data processing apparatus and, for this reason, no further description of the system control unit and the central processing unit and their interconnection with one another and the ancillary units is believed to be necessary.

The present invention is more particularly concerned with the safeguarding of the various units to prevent information relating to one programme being written into any storage device or output unit allocated to another programme. For this purpose each of the ancillary units 11, 12 and 13 is provided with a register 20 which may typically be a set of bistable units and which is set at zero when the ancillary unit is unemployed and which carries a number identifying the particular programme when the ancillary is to receive or to transfer information relating to such a programme. It will be appreciated that a number of the ancillaries may be concerned only with one programme and in such a case the associated register 20 will only have to take up one possible state. If an ancillary unit, for example an output printer, is to accept information relating to two or more different programmes however, then it must distinguish between these programmes and the associated register 20 has to be set up accordingly to identify the appropriate programme, the various programmes having different numbers for this purpose. In the central processing unit 10 there is provided an active programme register 21 which stores a number representing the active programme in the central processing unit. When the system control unit 15 connects an ancillary unit to the central processing unit, by opening one of the gates 16, 17, 18 for interchange of information, the numbers in the register 20 of the appropriate ancillary unit and the active programme register 21 in the central processing unit are compared in a comparator 22 in the central processing unit. If the two numbers agree, the process is allowed to continue. If, however, the numbers fed to the comparator do not agree, the output of the comparator inhibits the transfer of information between the ancillary unit and the central processing unit. An indication may also be given for example by reporting on a monitoring typewriter. The system control unit 15 may open two gates, for example gates 16 and 17, simultaneously in order to transfer information from one ancillary unit 11 to another ancillary unit 12. In this case the comparator 22 compares the numbers on the registers 20 in the two ancillaries and inhibits the transfer of information unless the two numbers agree.

The fast access store 14 may be divided into blocks which are each associated with one programme only. Each of these blocks may then be safeguarded by treating it as a separate ancillary unit; thus each block would be provided with a register for storing the number of the associated programme and the comparator 22 be arranged to compare the number in this register with the number in the active programme register 21 if information is to be transferred to or from the store by the central processing unit or with the number in the appropriate register 20 if information is to be transferred to or from the fast access store by an ancillary unit. In the particular arrangement illustrated in FIGURE 1, however, for each block there are provided registers in the central processing unit defining the limits of the block. These registers are in a limit number store 23 which for each block has two registers defining the first and last locations of the block. A double subtracting unit 24 is also provided in the central processing unit 10 and, when information is to be transferred to or from a selected location in the main store 14, the double subtracting unit 24 compares the address of the selected location with the data defining the limits of the block associated with the appropriate programme defined by the programme number in the active programme register 21 which active programme register controls the limit number store 23 for this purpose. The double subtracting unit 24 inhibits the transfer of information unless the selected location is within the defined block limits.

It will be appreciated that a number of ancillary units may be treated as a block if they are always employed on the same programme and if information is never transferred between these ancillary units; in this case, a single safeguarding register 20 may be provided for a whole group of ancillaries as for the group 13 in FIGURE 1.

FIGURE 2 illustrates another embodiment of the invention. In FIGURE 2 the same reference characters have been used as in FIGURE 1 to illustrate corresponding components and, in the following description, reference will only be made to those features of FIGURE 2 which are distinct from the arrangement of FIGURE 1. In the arrangement of FIGURE 2 there are provided a number of separate programme ancillary units 30, 31 and 32 each of which is associated with one particular programme. Each programme ancillary includes a limit store 35 specifying the limits of quick access storage allocated to that programme and conveniently comprising two registers defining the first and last location of the appropriate block in the fast access store 14. These limit registers would not normally be accessible to the programmer and would preferably be arranged so that they can only be written into by the input routine. Each programme ancillary unit, in addition to the limit registers 35, comprises a sequence control register 36 for inserting a specified sequence of instruction into the central processing unit 10 one after the other and an indicator 37 for showing whether the programme is active or not. The programme ancillaries 30, 31, 32 in general would not have any processing facilities of their own. The central processing unit 10 may however insert data into the sequence control register 36 of a programme ancillary unit as is required for example when performing jump instructions. Associated with each programme ancillary unit are two ancillary registers which are in fact locations in the fast access store 14 of the central processing unit 10. The data processing apparatus is arranged, so that, when a programme ancillary unit is activated, the sequence control number and the contents of the accumulator for that programme are transferred from the two ancillary registers allocated to that programme ancillary unit to active registers in the central processing apparatus. Similarly when the programme is suspended the sequence control number and the contents of the accumulator in the central processing unit 10 are returned to the ancillary registers. The ordinary programme is suspended when an ancillary input or output device calls for the use of the central processing unit 10, the ordinary programme vacating the active programme registers for the period of interruption. In this particular arrangement in which each programme ancillary unit has two ancillary registers for storing the sequence control number and the contents of the accumulator, an interruption programme called for by one ancillary input or output unit cannot be interrupted by another interruption programme and the system control must be arranged accordingly. If the central processing unit 10 has more than one accumulator an appropriate number of registers would need to be provided so that the contents of all the accumulators may be temporarily transferred to the registers when a programme is suspended.

In the arrangement of FIGURE 2 when the system control gives an instruction which would result in the transfer of information to or from the fast access store 14, for example from one of the ancillary units 11, 12, 13, the system control unit 14 also activates the appropriate programme ancillary 30, 31 or 32 in accordance with the programme to be effective. The limits in the store 35 of the programme ancillary are compared in the double subtraction unit 34 with the specified operand and provided this lies within the block specified by the two limit registers, the process will continue. Means are provided for indicating to an operator if the operand does not lie within the specified limits. The arrangement of FIGURE 2 operates in exactly the same manner as the arrangement of FIGURE 1 to safeguard the ancillary units if information is to be transferred between two ancillary units, the numbers in the register 20 being compared in the comparator 22 and the transfer only taking place if the compared numbers agree.

In the embodiments of FIGURES 1 and 2, the comparator means, when inhibiting the transfer of information, are arranged to prevent the information being inserted in a location where it would interfere with some other programme so preventing one programmer, by making a mistake, from spoiling another programmer's data. The comparator means may alternatively or additionally be arranged to prevent, during the execution of one programme, the extraction of data relating to another programme so safeguarding said one programme against erroneous use of data belonging to some other programme.

I claim:

1. Data processing apparatus having a number of ancillary units and a central processing unit for carrying out two or more programmes on a time-sharing basis wherein there is provided a control register storing the number of the programme currently being performed by the central processing unit and wherein each ancillary unit is provided with a register storing the number of the programme currently associated with that ancillary unit and wherein comparator means are provided, operative when an instruction is about to be performed involving the transfer of information from one ancillary unit to another ancillary unit or the transfer of information to or from the central processing unit, which comparator means compare the numbers in the registers of the ancillary units between which the information is to be transferred or the numbers in the control register and the ancillary register if information is to be transferred to or from the central processing unit, said comparator means being arranged to inhibit the transfer of information unless the compared numbers agree.

2. Data processing apparatus as claimed in claim 1 and having a main store divided into blocks which are each associated with one programme only and wherein, for each block, there is provided a register storing the number of the associated programme and wherein said comparator means are arranged, when information is to be transferred to or from a selected location in the main store, to compare the number on the register associated with the block containing the selected location with the number in the control register or with the appropriate ancillary register according to the destination or source of the information to be transferred.

3. Data processing apparatus as claimed in claim 1 and having a main store divided into blocks which are each associated with one programme only and wherein, for each block, there are provided registers storing data defining the limits of the block and wherein double comparator means are provided, operative when information is to be transferred to or from a selected location in the main store, to compare the address of the selected location with the data defining the limits of the block associated with the appropriate programme defined by the programme number in the control register or the appropriate ancillary register according to the destination or source of the information to be transferred, said double comparator means being arranged to inhibit the transfer of information unless the selected location is within the defined block limits.

4. Data processing apparatus having a number of ancillary units and a central processing unit for carrying out two or more programmes on a time-sharing basis wherein the central processing unit has a main store forming quick access storage divided into blocks which are each associated with one programme only and wherein there is provided, for each programme, a separate programme ancillary unit for inserting the appropriate sequence of instructions for the programme into the central processing unit, each programme ancillary unit having registers for storing data specifying the limits of quick access storage in the central processing unit required for that programme and wherein each programme is arranged so that, if any instruction is extracted the result of which will be for data to be deposited in the quick access storage, the specified location in the store of such data is compared with the specified limits of quick access storage for that programme and the instruction is carried out only if the location is within these limits.

5. Data processing apparatus as claimed in claim 4 wherein the registers in each programme ancillary unit for storing data specifying the limits of quick access storage for a programme comprise two registers defining the first and last locations of a block of storage locations allocated to the programme and wherein a comparator unit is arranged, when an instruction is extracted of which the result will be for data to be deposited in the quick access storage, to effect two subtractions to see whether the location specified by said instruction lies within the block specified by the two limit registers.

6. Data processing apparatus as claimed in claim 5 wherein means are provided for indicating to an operator if said specified location does not lie within the specified limits.

7. Data processing apparatus as claimed in claim 6 wherein each programme ancillary unit includes a sequence control register for inserting a specified sequence of instructions into the central processing unit one after the other.

8. Data processing apparatus as claimed in claim 7 wherein each ancillary unit is provided with a register holding data representative of the program for which the ancillary unit is active when information is to be transferred and wherein the central processing unit has a control register storing the number of the programme currently being performed by the central processing unit and comparator means operative when an instruction is about to be performed involving the transfer of information from one ancillary unit to another ancillary unit or the transfer of information to or from the central processing unit, which comparator means compare the numbers in the registers in the ancillary units between which the information is to be transferred or the numbers in the control register and the ancillary register if information is to be transferred to or from the central processing unit, said comparator means being arranged to inhibit the transfer of information unless the numbers agree.

9. Data processing apparatus as claimed in claim 8 wherein each programme ancillary unit has further registers from which are transferred the sequence control number and contents of the accumulator when a programme ancillary unit is activated and into which are transferred the sequence control number and contents of the accumulator when a programme is suspended.

10. Data processing apparatus as claimed in claim 9 wherein said comparator means, in inhibiting the transfer of information, are arranged to prevent the information being deposited in a location where it would interfere with some other programme.

11. Data processing apparatus as claimed in claim 10 wherein said comparator means, in inhibiting the transfer of information, are arranged, during the execution of one programme, to prevent information relating to another programme being extracted and utilised.

References Cited by the Examiner

UNITED STATES PATENTS

| | | | |
|---|---|---|---|
| 3,029,414 | 4/1962 | Schrimpf | 340—172.5 |
| 3,061,192 | 10/1962 | Terzian | 340—172.5 |
| 3,079,082 | 2/1963 | Scholten | 340—172.5 |
| 3,142,043 | 7/1964 | Schrimpf | 340—172.5 |

ROBERT C. BAILEY, *Primary Examiner.*

P. L. BERGER, *Assistant Examiner.*